United States Patent
Sato et al.

(10) Patent No.: US 6,661,006 B2
(45) Date of Patent: Dec. 9, 2003

(54) SCANNING PROBE INSTRUMENT

(75) Inventors: Yukihiro Sato, Chiba (JP); Ryuichi Matsuzaki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 151 days.

(21) Appl. No.: 09/888,776

(22) Filed: Jun. 25, 2001

(65) Prior Publication Data

US 2002/0005482 A1 Jan. 17, 2002

(30) Foreign Application Priority Data

Jul. 6, 2000 (JP) ........................... 2000-204978

(51) Int. Cl.[7] .................. G12B 21/20; G12B 21/22; G01N 37/00; H01J 37/00
(52) U.S. Cl. ............................. 250/306; 250/442.1
(58) Field of Search ....................... 250/306, 442.1

(56) References Cited

U.S. PATENT DOCUMENTS 6,078,044 A * 6/2000 Yasutake et al. ............. 250/306

FOREIGN PATENT DOCUMENTS

JP    09304401 A   * 11/1997   ........... G01N/37/00
JP    09304402 A   * 11/1997   ........... G01N/37/00

* cited by examiner

Primary Examiner—Huan Tran
(74) Attorney, Agent, or Firm—Adams & Wilks

(57) ABSTRACT

A scanning probe instrument which can calibrate measured values and permits accurate length measurements regardless of a magnification factor. A scan signal generator produces a fine movement signal that is amplified or attenuated by an attenuator. Magnification data items for various magnification modes are stored in a dimensional relation storing portion. A magnification selector portion reads data for setting either magnification corresponding to the present mode of operation of the scanning probe instrument specified by a mode signal from the dimensional relation storing portion and sends it to an attenuator. The attenuator amplifies or attenuates the scan signal at a magnification corresponding to the magnification data supplied via the magnification selector portion.

8 Claims, 4 Drawing Sheets

SCANNING PROBE INSTRUMENT

BACKGROUND OF THE INVENTION

1. Field of the Invention

The present invention relates to a scanning probe instrument such as a scanning probe microscope and, more particularly, to a scanning probe instrument capable of making calibrations regarding metrology accuracy easily and accurately.

2. Description of the Related Art

The present applicant has already invented a scanning probe instrument having a zooming function as shown in FIG. 3 and filed an application for patent (Japanese patent application No. 118015/1996). The structure and operation of this scanning probe instrument are briefly described below.

An enclosure 1 has a scanning tube 20 whose main portion consists of a thin tubular portion 14 protruding into a sample chamber and a thick tubular portion 15 continuous with the thin tubular portion 14. An inner cylinder 13 is supported inside the thick tubular portion 15 via a viscous body 17. These members, i.e., the thick tubular portion 15, the inner cylinder 13, and the thin tubular portion 14, are made of the same material such that they are identical in thermal conductivity and coefficient of thermal expansion.

A first voice coil motor is mounted on top of the enclosure 1. This first voice coil motor comprises a magnet 2 having a core rod portion 3, a movable element 4a around which a coil 5 is wound, a movable element part 4b fixedly mounted to the movable element 4a, a membrane 6a, and a firmly holding part 6b firmly holding the outer periphery of the membrane 6a. A spindle 8 extending in the Z-direction is firmly mounted to the movable element part 4b. A detector 9 for detecting the amount of displacement of a probe 10 is mounted to the lower end of the spindle 8.

The spindle 8 is resiliently held by first and second springs 11 and 12, respectively, held to the inner cylinder 13. A heating coil 16 is wound at a position that is outside the thick tubular portion 15 and located opposite to the viscous body 17. The heating coil 16 is electrically energized to soften the viscous body 17 during coarse Z motion of the probe 10.

Mounted beside the enclosure 1 is a second voice coil motor comprising a magnet 21 having a core rod portion 22, a movable element 23a around which a coil 24 is wound, a movable element part 23b firmly fixed to the movable element 23a, a membrane 25, and a firmly holding part 25a firmly holding the outer periphery of the membrane 25.

Also mounted beside the enclosure 1 is a thin annular leaf spring 23c for preventing the movable element 23a from touching the core rod portion 22 or the magnet 21 when the thick tubular portion 15 of the scanning tube 20 tilts in the X- or Y-direction. The outer periphery of the thin annular leaf spring 23c is held down by both enclosure 1 and membrane firmly holding part 25a. The inner surface portion is held down by both the movable element part 23b and an annular spring-holding part 23d. A spindle 27 extending in the X-direction is mounted to the movable element part 23b and to the annular spring-holding part 23d. This spindle 27 has a free end rigidly affixed to the protruding portion 15a of the thick tubular portion 15.

A third voice coil motor (not shown) is mounted in a direction differing by 90° from the direction of the second voice coil motor. This third voice coil motor is identical or similar in structure with the second voice coil motor described above. A Y-direction (vertical to the plane of the paper) spindle interconnects a movable element part rigidly mounted to the movable element of the third voice coil motor and the aforementioned thick tubular portion 15. The probe 10 is scanned in the X- and Y-directions by driving the second and third voice coil motors.

A sample stage (not shown) is placed opposite to the probe 10. A sample to be inspected or processed is placed on the sample stage. This sample stage is positioned on coarse X-, Y-, and Z-stages (not shown).

An outer tubular portion 71 whose one side is securely mounted to the enclosure 1 is mounted outside the thin tubular portion 14 and extends coaxially with the thin tubular portion 14 in a direction to protrude into the sample chamber described previously. A heat transfer ring 73 is mounted on the outer periphery of the front end of the outer tubular portion 71. A heating coil 76 is wound around the heat transfer ring 73 via a heat-insulating member 72 made of a ceramic or the like. The ends of the heat transfer ring 73 are inserted in a holder 74 for the heat-insulating member. A low-melting-point metal 75 such as U-alloys is received in the holder 74.

The energizing current through the heating coil 76 is turned on and off to melt and solidify the low-melting-point alloy 75 to switch the spring rigidity between one given only by the thin tubular portion 14 and one given by both thin tubular portion 14 and outer tubular portion 71. In this way, the range in which the scanning tube 20 can be driven in the X- and Y-directions by the same driving force of each voice coil motor is changed. Hence, a zooming function can be accomplished.

When a sample is measured, the probe 10 is brought close to the sample at a coarse motion velocity. When its tip comes into contact with the surface of the sample, the temperature of the viscous body 17 is lowered to a preheating temperature by adjusting the energizing current through the heating coil 16. This increases the viscosity of the viscous body 17, making stationary the thick tubular portion 15 and the inner cylinder 13. In consequence, measurement of the sample is enabled.

In the scanning probe instrument of the structure described above, the scan distance of the probe 10 represents a measured value. The scan distance depends on the force that deflects the scanning tube 20, i.e., the amplitude of the scan signal supplied to each voice coil motor. Accordingly, the relation between the amplitude of the scan signal and the scan distance of the probe 10 needs to be calibrated to maintain a predetermined relation at all times.

FIG. 4 is a diagram showing the structure of a driver circuit for a voice coil motor 24 in the prior art scanning probe instrument. This driver circuit comprises a scan signal generator 40 for producing a triangular wave used as a scan signal, a first operational amplifier 41 for amplifying and supplying the scan signal to the voice coil motor 24, a second operational amplifier 42 having one input terminal connected with the output side of the voice coil motor 24, a resistor 43 used for detection of an electric current and connected with the output side of the voice coil motor 24, and resistors 44, 45 for determining the gain G of the second operational amplifier 42. The output of the second operational amplifier 42 is connected with the negative (−) terminal, or inverting input terminal, of the first operational amplifier 41. The electric current IL flowing through the voice coil motor 24 is given by IL=VL/R. The gain G of the second operational amplifier 42 is given by G=(R1+R2)/R1.

Calibration of measured values is made by comparing each measured value obtained by scanning a reference sample with the calibration value of this reference sample and adjusting the variable resistor R2 such that they agree, the resistor R2 being used for voltage adjustment.

The probe instrument equipped with a zooming mechanism has both a wide mode in which the low-melting-point metal 75 is softened, only the thin tubular portion 14 is bent, and a scan is made over a wide range and a zoom mode in which the low-melting-point metal 75 is hardened, both thin tubular portion 14 and outer tubular portion 71 are bent, and a scan is made over a narrow range. The relation between the current value supplied to the voice coil motor 24 and the amount of movement of the probe 10 differs between the wide mode and the zoom mode. Therefore, it has been necessary to adjust the variable resistor R2 for each different metrology mode.

The amount of movement of the probe 10 in the zoom mode depends on the hardness of the low-melting-point metal 75 and on the rigidity of the thick tubular portion 71, as well as on the rigidity of the thin tubular portion 14. Accordingly, the rigidity varies widely among individual instruments. Since the variable resistor R2 must be finely adjusted for each instrument, it is desired that the operation can be performed easily.

SUMMARY OF THE INVENTION

It is an object of the present invention to provide a scanning probe instrument which solves the foregoing problems with the prior art technique, can easily calibrate measured values, and permits accurate metrology irrespective of the magnification factor.

To achieve the above-described object, the present invention provides a scanning probe instrument having a probe that is brought close to a sample surface and scanned in X- and Y-directions to maintain constant the gap between the probe and the sample surface while finely moving the probe in the Z-direction, the scanning probe instrument being characterized in that it has a fine motion signal-generating means for generating a fine motion signal to move the probe finely in at least one of the X-, Y-, and Z-directions, an attenuator for amplifying or attenuating the fine motion signal and sending out the amplified or attenuated fine motion signal, a fine driver means for finely driving the probe according to the output signal from the attenuator, and a registration means for registering a known dimension and a result of a length measurement. The attenuator amplifies or attenuates the fine motion signal according to the dimensional relation between the known dimension and the result of the length measurement.

Because of the feature described above, if the length of the reference sample is measured, and if the known length and the result of the measurement of the length are registered in the registration means, the fine motion signal is amplified or attenuated according to the dimensional relation between the registered known dimension and the result of measurement of the length. Therefore, the measured value can be easily calibrated.

DESCRIPTION OF THE PREFERRED EMBODIMENT

Figure 1:
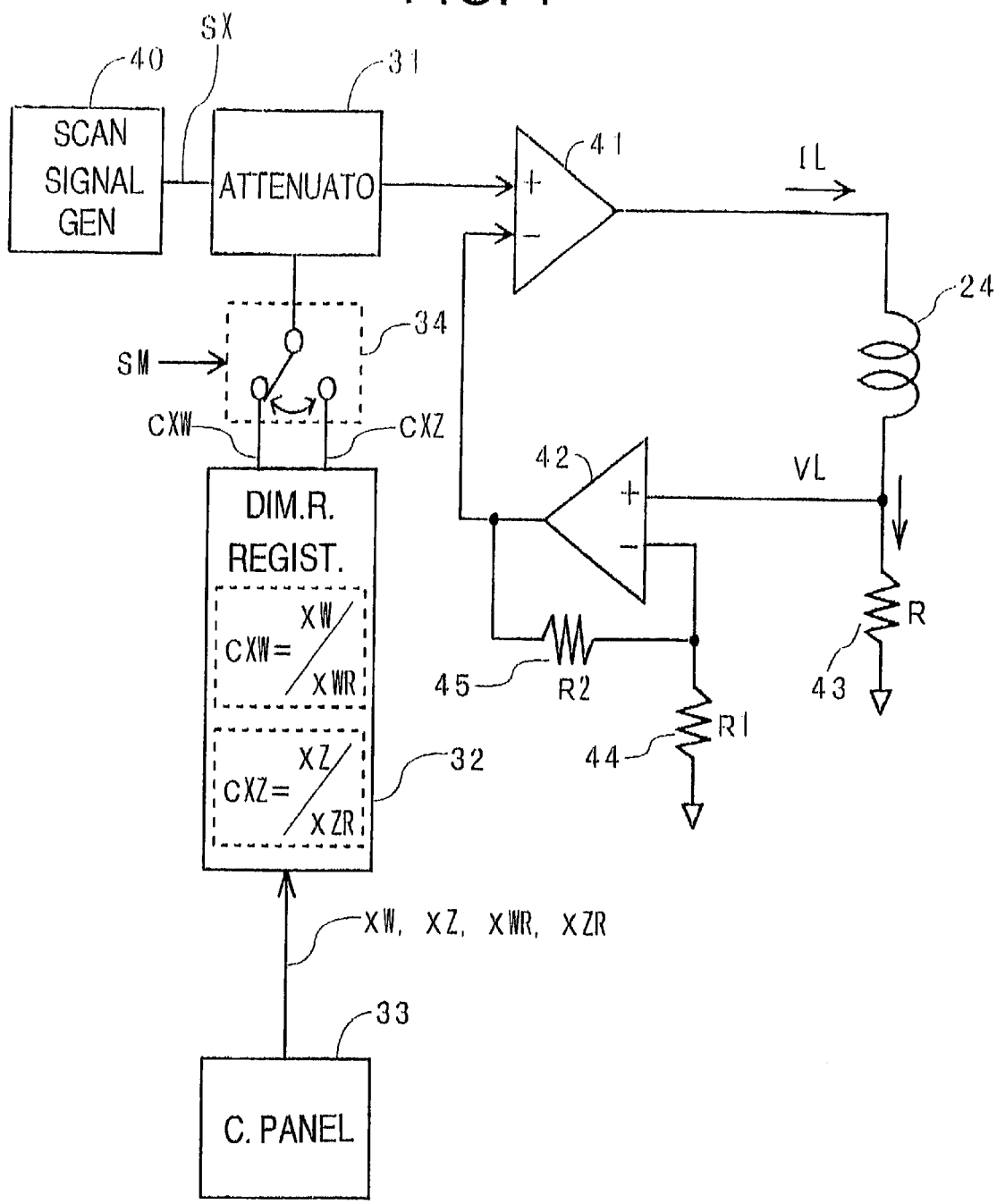
FIG. 1 is a block diagram of main portions of one embodiment of the present invention.

The present invention is hereinafter described in detail with reference to the drawings. FIG. 1 is a block diagram showing the structure of a driver circuit for a scanning probe instrument forming one embodiment of the present invention. It is to be noted that like components are indicated by like reference numerals in the foregoing and following description. Driver circuits for the X-, Y-, and Z-directions are equivalent in structure and only the driver circuit for the X-direction is described herein in order to simplify the description.

An X-scan signal SX produced by a scan signal generator 40 is applied to an attenuator 31, which amplifies or attenuates the applied scan signal SX analogously and supplies the amplified or attenuated signal to a first operational amplifier 41. Two magnification data items CXW and CXZ for specifying the magnification of the attenuator 31 are registered or stored in a dimensional relation registration portion 32. A magnification selector portion 34 reads data about either magnification from the dimensional relation registration portion 32 according to the present mode of operation of the scanning probe instrument specified by a made signal SM and sends the data to the attenuator 31. This attenuator 31 amplifies or attenuates the scan signal SX at a magnification corresponding to the magnification data supplied via the magnification selector portion 34.

In this structure, when the measured value is calibrated, the mode of operation of the scanning probe instrument is first set to the wide mode. The low-melting-point metal 75 is softened to separate the thin tubular portion 14 from the outer tubular portion 71. Then, the magnification/attenuation factor of the attenuator 31 is set to a temporary value (e.g., a magnification of 1×). The probe is scanned across the reference sample that has been calibrated and has a known dimension. Its observation image is obtained.

Figure 2:
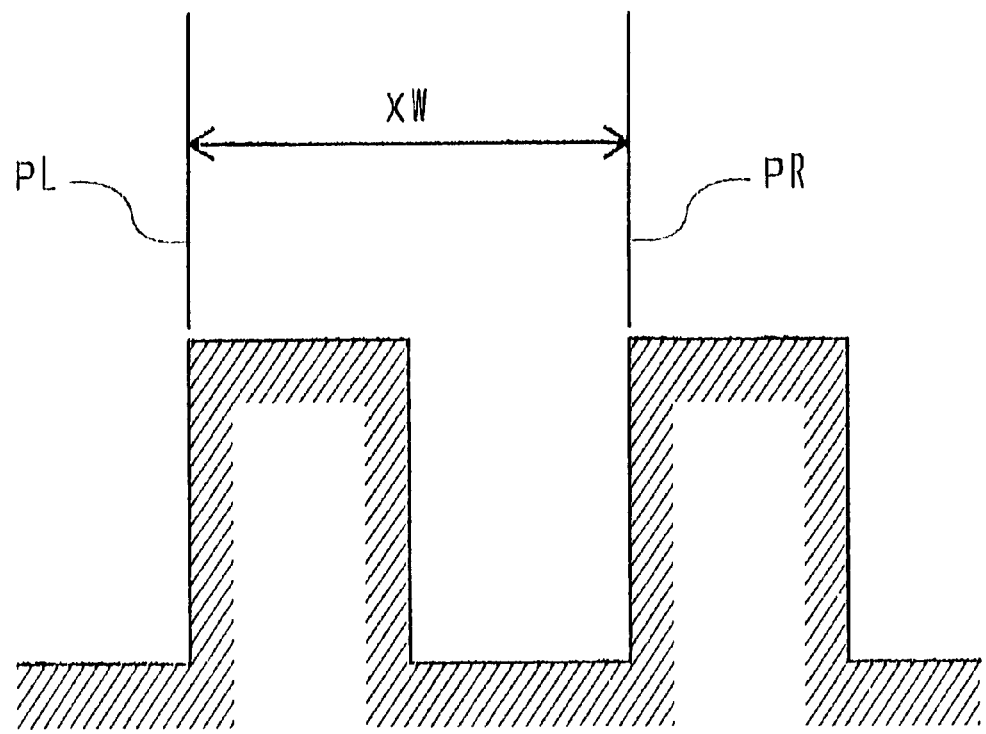
FIG. 2 is a diagram illustrating a calibration method in accordance with the present invention.
Figure 3:
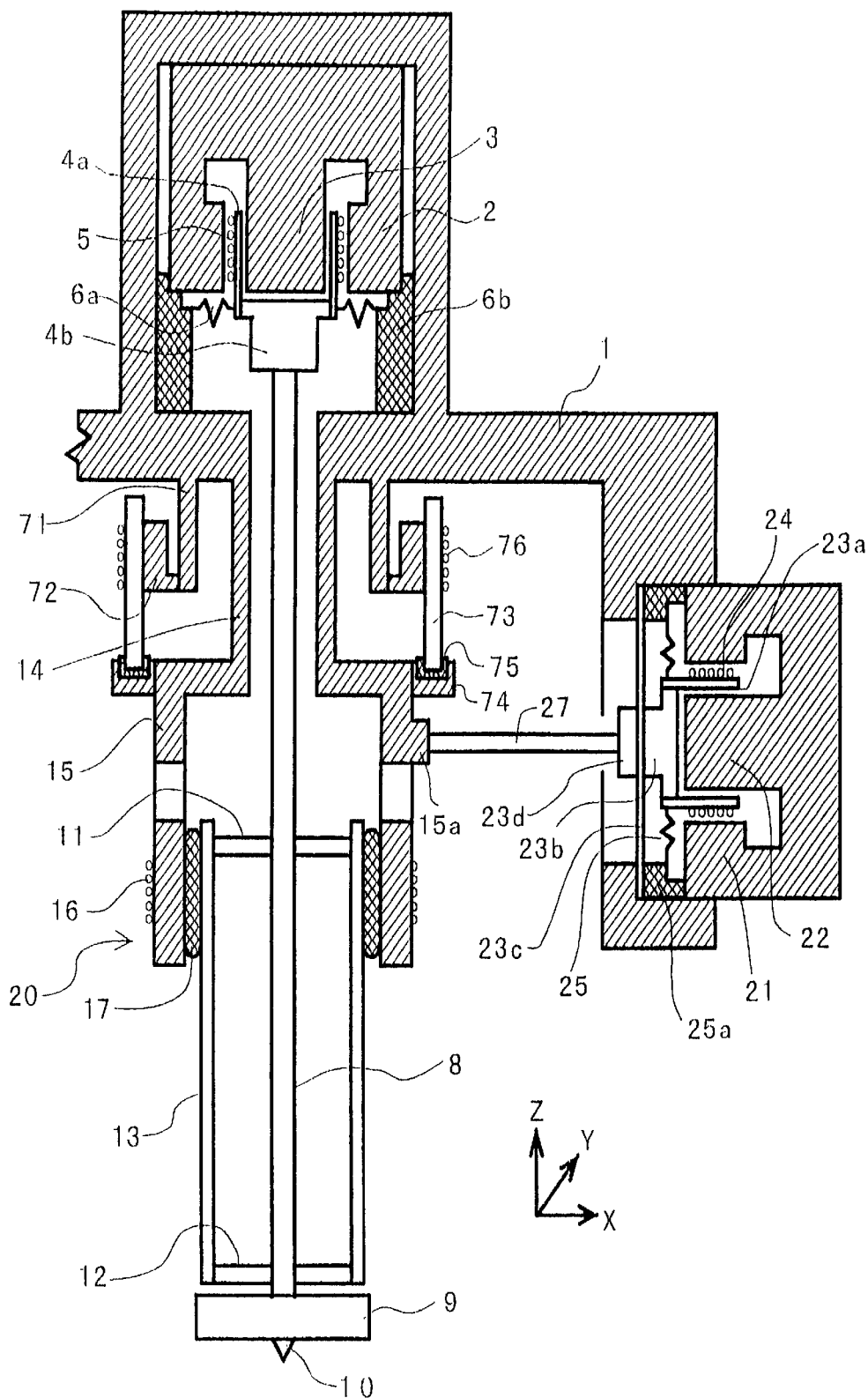
FIG. 3 is a cross-sectional view showing one example of scanning probe instruments for which applications were previously filed for patents.
Figure 4:
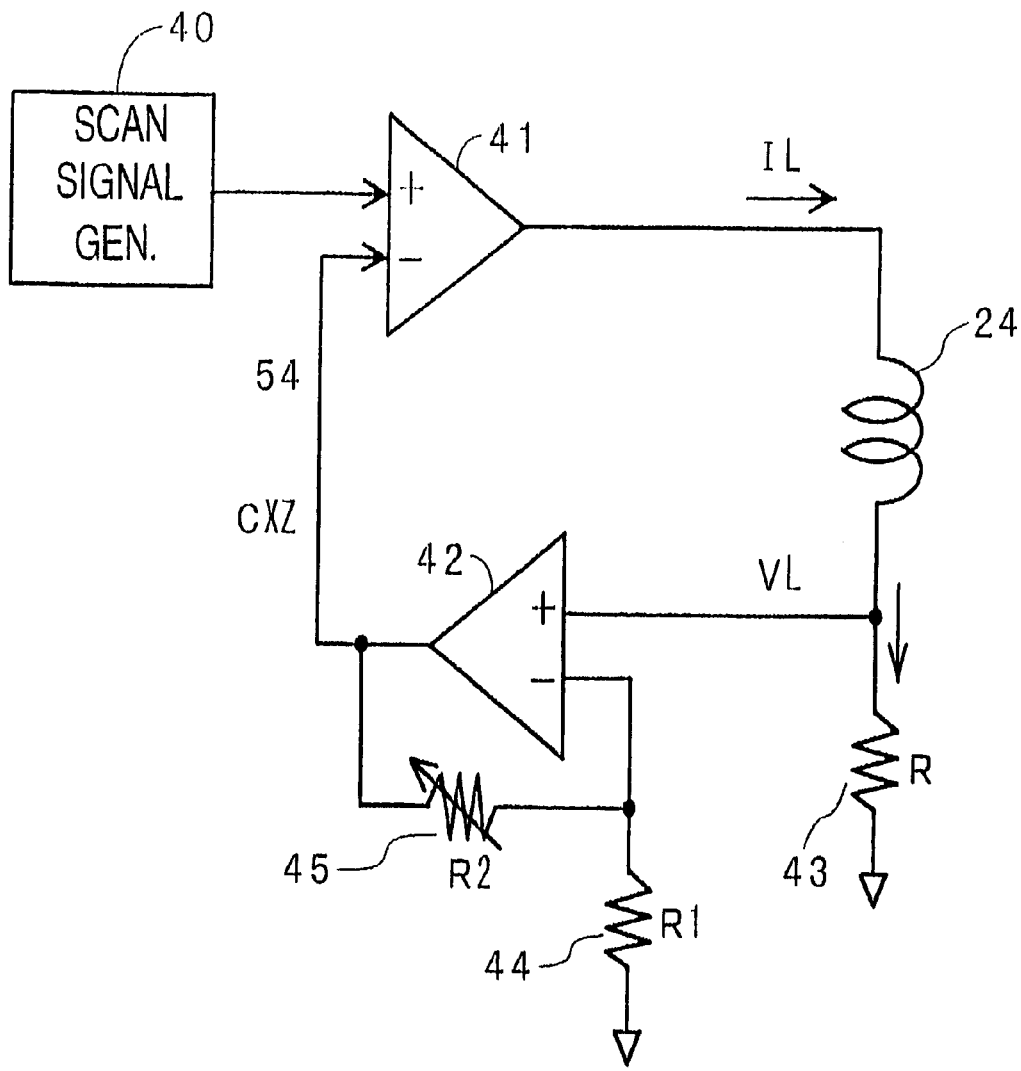
FIG. 4 is a block diagram illustrating the prior art technique.

Then, as shown in FIG. 2, a cursor PL, PR is set in a given position on the reference sample 60, and its length is measured. Then, the known dimension value XWR of the measured portion and the result of measurement XW are entered from a console panel 33 and registered in the dimensional relation registration portion 32. This dimensional relation registration portion 32 holds the ratio of the result of measurement XW to the known dimension value XWR, i.e., XW/XWR, as magnification data $C_{XW}$ used in the wide mode.

Then, the mode of operation of the scanning probe instrument is set to the zoom mode. The low-melting-point metal 75 is hardened to join together the thin tubular portion 14 and the outer tubular portion 71. Subsequently, the magnification/attenuation factor of the attenuator 31 is set to a temporary value (e.g., a magnification of 1×). The probe is scanned across the reference sample 60. Its observation image is obtained. Then, the length of the reference sample 60 in a given position is measured in the same manner as the foregoing. The known dimension value XZR of the measured portion and the result of measurement XZ are entered from the console panel 33 and registered in the dimensional relation registration portion 32. This dimensional relation registration portion 32 holds the ratio of the result of measurement XZ to the known dimension value XZR, i.e., XZ/XZR, as magnification data $C_{XZ}$ used in the zoom mode.

When registration of the magnification data items $C_{XW}$ and $C_{XZ}$ in the wide and zoom modes, respectively, is completed, actual length measurement is enabled.

During actual length measurement, if an operator sets the observation mode to either the wide or zoom mode, a mode signal SM representing this observation mode is supplied to the magnification selector portion 34. If the mode signal SM indicates the wide mode, the magnification selector portion 34 supplies the magnification data CXW (=XW/XWR) to the control terminal of the attenuator 31. The attenuator 31 amplifies or attenuates the scan signal SX by a factor of CXW and supplies the signal to the first operational amplifier 41.

Conversely, if the mode signal SM indicates the zoom mode, the magnification selector portion 34 supplies the magnification data CXZ (=XZ/XZR) to the control terminal of the attenuator 31. The attenuator 31 amplifies or attenuates the scan signal SX by a factor of CXZ and supplies the signal to the first operational amplifier 41.

The present invention produces the following effects.

(1) A measured value can be calibrated simply by measuring the length of a reference sample and inputting its known dimension and the measured value.

(2) An attenuator is connected between a scan signal generator and an operational amplifier. The amplification factor of the attenuator is adjusted to a magnification corresponding to the wide or zoom mode and, therefore, accurate length measurement is allowed, whether the observation mode is the wide mode or the zoom mode.

What is claimed is:

1. A scanning probe instrument for bringing a probe into close proximity to a surface of a sample and causing relative scanning movement of the probe with respect to the sample in X- and Y-directions while finely moving the probe in a Z direction such that a gap between the probe and the sample is maintained at a constant value, the scanning probe instrument comprising:

fine motion signal-generating means for generating a fine motion signal to move the probe finely in at least one of the X-, Y-, and Z-directions;

an attenuator for amplifying or attenuating the fine motion signal and outputting the amplified or attenuated fine motion signal;

fine driver means for finely driving the probe according to the output signal of the attenuator; and storing means for storing a known dimension and a result of a length measurement; wherein the attenuator amplifies or attenuates the fine motion signal according to a dimensional relation between the known dimension and the result of the length measurement stored in the storing means.

2. The scanning probe instrument of claim 1; further comprising a scanning tube having one end fixedly mounted to an enclosure and a free end to which the probe is attached; rigidity-varying means for varying the rigidity of the scanning tube; and scanning means for bending the scanning tube in the X- and Y-directions to scan the probe;

wherein the scanning probe instrument can operate in a wide mode in which the rigidity of the scanning tube is lowered so that scanning can be performed over a wide range and in a zoom mode in which the rigidity of the scanning tube is enhanced so that scanning can be performed over a narrow range;

wherein a first dimensional relation corresponding to the wide mode and a second dimensional relation corresponding to the zoom mode are stored in the storing means; and wherein the attenuator amplifies or attenuates the fine motion signal according to the first dimensional relation when the scanning probe instrument is being operated in the wide mode and amplifies or attenuates the fine motion signal according to the second dimensional relation when the scanning probe instrument is being operated in the zoom mode.

3. The scanning probe instrument of claim 2; wherein the attenuator produces an output signal analogous to its input signal.

4. The scanning probe instrument of claim 1; wherein the attenuator produces an output signal analogous to its input signal.

5. A scanning probe apparatus comprising: a probe; a scanning tube having one end fixedly mounted to an enclosure and a free end to which the probe is attached; scanning means for moving the probe into close proximity to a surface of a sample and bending the scanning tube to cause relative scanning movement of the probe with respect to the sample in two dimensions while finely moving the probe in a third dimension such that a gap between the probe and the sample is maintained at a desired value; rigidity-varying means for varying the rigidity of the scanning tube so that the scanning probe apparatus is operable in a wide mode in which the rigidity of the scanning tube is lowered so that scanning can be performed over a wide range and in a zoom mode in which the rigidity of the scanning tube is enhanced so that scanning can be performed over a narrow range; fine motion signal-generating means for generating a fine motion signal to move the probe finely in at least one of the three dimensions; an attenuator for amplifying or attenuating the fine motion signal and outputting the amplified or attenuated fine motion signal; fine driver means for finely driving the probe according to the output signal of the attenuator; and storing means for storing a known dimension and a result of a length measurement; wherein the attenuator amplifies or attenuates the fine motion signal according to a dimensional relationship between the known dimension and the result of the length measurement stored in the storing means.

6. A scanning probe apparatus according to claim 5, wherein a first dimensional relationship corresponding to the wide mode and a second dimensional relationship corresponding to the zoom mode are stored in the storing means; and the attenuator amplifies or attenuates the fine motion signal according to the first dimensional relationship when the scanning probe instrument is being operated in the wide mode and amplifies or attenuates the fine motion signal according to the second dimensional relationship when the scanning probe instrument is being operated in the zoom mode.

7. A scanning probe instrument comprising: a probe; rough movement means for bringing the probe into close proximity to a surface of a sample; a scanning tube for causing relative scanning movement of the probe with respect to the sample in two directions while finely moving the probe in a third direction such that a gap between the probe and the sample is maintained at a desired value; a controller for producing a fine motion signal indicating desired movements of the probe in the three directions by the scanning tube; and an attenuator for amplifying or attenuating the fine motion signal according to a dimensional relationship between a known dimension and a result of a length measurement and outputting the amplified or attenuated fine motion signal to the scanning tube.

8. A scanning probe instrument according to claim 7; wherein the scanning tube has one end fixedly mounted to an enclosure and a free end to which the probe is attached; and further comprising scanning means for bending the scanning tube in two directions to scan the probe; and rigidity-varying means for varying the rigidity of the scanning tube so that the scanning probe instrument is operable in a wide mode in which the rigidity of the scanning tube is lowered so that scanning can be performed over a wide range and in a zoom mode in which the rigidity of the scanning tube is enhanced so that scanning can be performed over a narrow range; wherein a first dimensional relationship corresponding to the wide mode and a second dimensional relationship corresponding to the zoom mode are stored in the storing means; and wherein the attenuator amplifies or attenuates the fine motion signal according to the first dimensional relationship when the scanning probe instrument is being operated in the wide mode and amplifies or attenuates the fine motion signal according to the second dimensional relationship when the scanning probe instrument is being operated in the zoom mode.

* * * * *